(12) United States Patent
Singh et al.

(10) Patent No.: US 11,841,972 B2
(45) Date of Patent: Dec. 12, 2023

(54) SYSTEM AND METHOD TO SAFEGUARDING SENSITIVE INFORMATION IN COBROWSING SESSION

(71) Applicant: Avaya Management L.P., Santa Clara, CA (US)

(72) Inventors: Harsimran Jeet Singh, Pune (IN); Jibin George, Pune (IN); Sandeep Goynar, Pune (IN); Valentine C. Matula, Granville, OH (US)

(73) Assignee: Avaya Management L.P., Santa Clara, CA (US)

( * ) Notice: Subject to any disclaimer, the term of this patent is extended or adjusted under 35 U.S.C. 154(b) by 99 days.

(21) Appl. No.: 17/075,542

(22) Filed: Oct. 20, 2020

(65) Prior Publication Data

US 2022/0121772 A1 Apr. 21, 2022

(51) Int. Cl.
| | | |
|---|---|---|
| *G06F 40/174* | (2020.01) | |
| *G06F 21/62* | (2013.01) | |
| *G06N 3/04* | (2023.01) | |
| *H04L 65/401* | (2022.01) | |
| *G06N 3/08* | (2023.01) | |
| *G06F 18/214* | (2023.01) | |

(52) U.S. Cl.
CPC ...... *G06F 21/6245* (2013.01); *G06F 18/2148* (2023.01); *G06F 21/6227* (2013.01); *G06F 40/174* (2020.01); *G06N 3/04* (2013.01); *G06N 3/08* (2013.01); *H04L 65/4015* (2013.01); *G06F 2221/2125* (2013.01)

(58) Field of Classification Search
CPC .............. G06F 40/174; G06F 21/6245; G06F 21/6227; G06F 18/2148; G06F 2221/2125; G06N 3/04; G06N 3/08; H04L 65/4015
See application file for complete search history.

(56) References Cited

U.S. PATENT DOCUMENTS

| | | | |
|---|---|---|---|
| 9,602,670 B2 | 3/2017 | Balasaygun et al. | |
| 10,474,840 B2* | 11/2019 | Powell | .................... H04L 63/20 |
| 11,165,755 B1* | 11/2021 | Qian | ...................... H04N 5/272 |
| 2017/0221154 A1* | 8/2017 | Eftekhari | ............. G06Q 40/123 |
| 2021/0182430 A1* | 6/2021 | Negi | .................... G06F 21/6263 |

* cited by examiner

*Primary Examiner* — Kyle R Stork
(74) *Attorney, Agent, or Firm* — Sheridan Ross P.C.

(57) ABSTRACT

Co-browsing sessions allow an agent to see inputs of a user and assist the user in completing a task associated with the inputs, such as completing a form on an application or website. Agents may see the information provided by the user, unless that information is sensitive (e.g., social security number, account number, password, etc.), in which case the information is blocked. However, humans will make mistakes for any number of reasons. When that mistake is the providing of sensitive information in a non-sensitive field, systems and methods are provided to block such information, even when provided into a field not designated for sensitive information (e.g., city of residence). As a result, sensitive information may be entered during a co-browsing session, into a field by mistake, and not expose the information to the agent.

20 Claims, 6 Drawing Sheets

| Field_ID | Field Name | Sensitive |
|---|---|---|
| Web_form3_LN | Last Name | No |
| Web_form3_FN | First Name | No |
| Web_form3_A | Address | No |
| Web_form3_AN | Account Number | Yes |

*Fig. 2*

| | MaskID | Sensitive Data Mask | Likely Data type | Sensitive | Last Name | Address |
|---|---|---|---|---|---|---|
| 314A | | | | | | |
| 314B | 1 | nnnn-nnnn | Account Number | #Rule_31 | <0.01% | 6.3% |
| 314C | 2 | nnnn-nnnn-nnnn-nnnn | Account Number | Yes | <0.01% | 7.3% |
| 314D | 3 | nnnnnnnn[n] | Account Number | Yes | <0.01% | 8.3% |
| 314E | 4 | nn/nn/nn | Date of Birth | Yes | <0.01% | 0.05% |
| | 5 | nn/nn/nnnn | Date of Birth | Yes | <0.01% | 0.06% |

*Fig. 3*

| Rule ID | Field ID | Condition | Condition=True | Condition=False |
|---------|----------|-----------|----------------|-----------------|
| #Rule_31 | Web_Form3_A | Address_City=ABC | Not_sensitive | MaskID=Next_Mask |

*Fig. 4*

SYSTEM AND METHOD TO SAFEGUARDING SENSITIVE INFORMATION IN COBROWSING SESSION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for co-browsing and particularly to avoiding errant disclosure of sensitive information.

BACKGROUND

In prior-art systems, a co-browsing session may be conducted, such as between a customer, utilizing a web-browser or other application executing on a customer device, and an agent, utilizing a co-browsing application on an agent device. The agent is then able to see inputs and operations provided by the customer, and optionally provide, such inputs while optionally engaged in a second communication. The second communication may be a voice call, voice-video call, or text chat between the agent and the customer. As result the agent may be able to guide, advice, or correct entries provided by the customer to a particular web page or application. Co-browsing is particular helpful when a customer is attempting to fill out a form that may be complex or for which the customer has many questions or otherwise requires more interactive assistance.

Currently, co-browsing sessions mask fields that contain critical or otherwise sensitive information that the agent does not need to see, other than to know the information has, has not, or is in the process of being provided. For example, social security numbers, account numbers, passwords, etc. provided by a customer during a co-browsing session are only revealed to the agent as stars, asterisks, blocks, or other indicia of content without revealing the content itself. For fields that are not critical, such widely known, non-private information (e.g., street address, state of residence, etc.) or necessary to be presented to the agent in order for the agent to provide assistance to the customer, the content entered by the customer is presented to the agent.

SUMMARY

Humans, and systems, are prone to errors due to misunderstanding, lack of attention, poor website design, or other factors. For example, a customer may misread, not understand, or understand but mistakenly have focus (e.g., location of cursor) in an unintended location and, as a result, enter critical information in a non-critical field. For example, entering an account number or social security number in an address field. Additionally, many browsers support auto-fill or auto-complete. If a web form asks for information, the web browser may incorrectly associate critical data stored by the web browser with a non-critical field and, as a result, populate the field with critical data and thereby providing the agent with unnecessary and/or sensitive data. Such data exposes Personal Identity Information (PII) to unnecessary risk and/or violates Payment Card Industry (PCI) standards.

In another embodiment, fields that are critical (e.g., are designated for sensitive information) are masked and thereby not provided to the agent. Fields not designated as critical are provided to the agent, but a customer, by mistake or due to lack of concentration, may put critical data on non-critical fields, such as due to the adjacency of critical and non-critical fields. Customer may start typing data unaware that they are typing on wrong fields. So by mistake if a customer types critical data of type PII (personal identifiable information) like Account number, Transaction Passwords and other critical data in the fields which are not masked (non-critical fields), it directly exposes Customer to High risk of data theft, forgery and other type of data frauds.

In prior art systems, a customer, or customer's auto-fill/auto-complete, may enter critical data in non-critical fields in a co-browsing session with the agent.

These and other needs are addressed by the various embodiments and configurations of the present invention. The present invention can provide a number of advantages depending on the particular configuration. These and other advantages will be apparent from the disclosure of the invention(s) contained herein.

In one embodiment, a critical data identifier and notifier (CDIN) module is disclosed to leverage patterns of account numbers, date of birth, unique identification number, etc. The pattern is maintained in a storage of, or accessible to, a co-browsing server.

For example, a Mastercard credit card starts with 51, 52, 53, 54, 55, 222100-272099 and is 16-19 digits long. Accordingly, a pattern such as 51XXXXXXXXXXXXXXXX, 222100XXXXXXXXXX, etc., is stored on the co-browsing server. When the customer starts entering the data, after entry of a few digits, such as the first four digits, the co-browsing server will compare the data entered against the pattern of credit card numbers, or other pattern for other types of critical data. As a result, the customer may be notified, the information may be blocked from being presented to the agent, and/or other action taken to protect the data from unnecessary exposure.

Similarly, if the customer enters "nnn-" (e.g., "296-"), and account numbers do not have a dash, then it is something else. The "CDIN" unit using machine learning/pattern matching may be trained to see the number as confidential, such as when matching a Social Security number in the form of xxx-xx-xxxx. Other pattern matching, such as resembling a data (e.g., date of birth) entered as "03/" may match a date pattern and, accordingly, be blocked or otherwise obscured from the agent.

In another embodiment, a temporary mask may be applied to some or all fields of a page or online form and removed when the pattern matching rules either match what is expected for that field and/or do not match sensitive data or other PCI/PII information. After which, the data is revealed to the agent. This preemptive masking may apply to all fields or only fields that are non-critical fields (critical fields may be and remain blocked). Before the data is unmasked, activity may be shown in the form of stars, asterisks, blocks, or other indicia of content or indicia of content being provided (e.g., the customer has provided at least one character into the field).

In another embodiment, information that is entered by the customer, in a field where non-sensitive information is expected, but is or matches a pattern for sensitive data, may cause a notification to be provided to the agent. This notification may be a color coding of the field, text message, pop-up message etc. notifying the agent that the customer may be mis-entering data. The agent may then respond to the customer via a second communication (e.g., text chat, voice call, etc.) such as to say, "The system suspects that you are entering a Social Security Number in the address field." It should be appreciated that data entered by the customer is not blocked from being entered into the underlying system (e.g., server) for processing, which may have its own error/mis-entry processing rules and procedures operating independently from what is, or is not, presented to the agent. For example, if a customer is entering an address that is in the form of "123-45" the agent may be blocked from seeing it, but the customer may continue completing the form.

In another embodiment, if the system fails to identify sensitive information being put into a non-sensitive data field, the agent may identify the field as receiving sensitive data. As a result, the field's contents may be blocked and/or omitted from a recording system. Additionally or alternatively an AI system may be trained or re-trained on the missed entry. Other statistics may be collected to determine false positives, false negatives, and/or other areas where AI training/retraining is needed and/or for other purposes.

It should be appreciated that terms, such as "customer," "customer device," "agent," and "agent device" are used as a convenience to promote understanding with regard to one embodiment but only identify first party as the party providing information into at least one data entry field during a co-browsing session, in the case of "customer" or "customer device", which may also be used interchangeable with "user" and/or "user device" herein. The second party, which may be identified as the agent, via an agent device, is selectively presented or blocked from receiving the data entry provided by the first party. The term customer (or user) and agent is non-limiting and only provide one embodiment. In other embodiments, Applicant contemplates the parties having different relationships or roles other than the customer (user)-agent relationship. For example, the user may be a student and the "agent" a teacher. Other roles between the first party and the second party are also contemplated as other embodiments.

In one embodiment, a system is disclosed, comprising: a communication interface to a network; a processor; wherein the communication interface receives, via the network, a data entry by a user utilizing a user device; and wherein the processor selectively presents or blocks the data entry from being presented to an agent by an agent device, while the agent device and user device are engaged in a co-browsing session; wherein the processor blocks the data entry upon the processor determining that the data entry is provided to a sensitive data field or the data entry comprises sensitive data entered into a non-sensitive data field; and wherein the processor presents the data entry upon the processor determining that the data entry comprises non-sensitive data entered into the non-sensitive data entry field.

In another embodiment, a method is disclosed, comprising: conducting a co-browsing session over a network with a user device utilized by a user and an agent device utilized by an agent; receiving an input from a user into a data entry field; selectively presenting or blocking the input to the agent via the agent device; wherein the input is blocked upon determining that the data entry is provided to the data entry field having a sensitive data field identifier or the data entry comprises sensitive data entered into the data field having a non-sensitive data field identifier; and wherein the input is presented upon determining that the data entry comprises non-sensitive data entered into the data field having the non-sensitive data entry field identifier.

In another embodiment, a server is disclosed, comprising: a network interface to a network and interconnecting a user device and an agent device for a co-browsing session wherein a user provides data to an application executing on the user device; a processor, comprising a number of microprocessors; a data storage comprising a non-transitory data storage accessible to the processor; and wherein the processor performs: receiving a data entry into the application; and presenting the data entry to the agent device upon determining that the data entry omits sensitive data and the data entry is to a non-sensitive data field of the application; blocking the data entry from the agent device upon determining that the data entry is to a sensitive data field of the application; and blocking the data entry from the agent device upon determining that the data entry comprises sensitive data.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 2 depicts a first data structure in accordance with embodiments of the present disclosure;

FIG. 3 depicts a second data structure in accordance with embodiments of the present disclosure;

FIG. 4 depicts a third data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
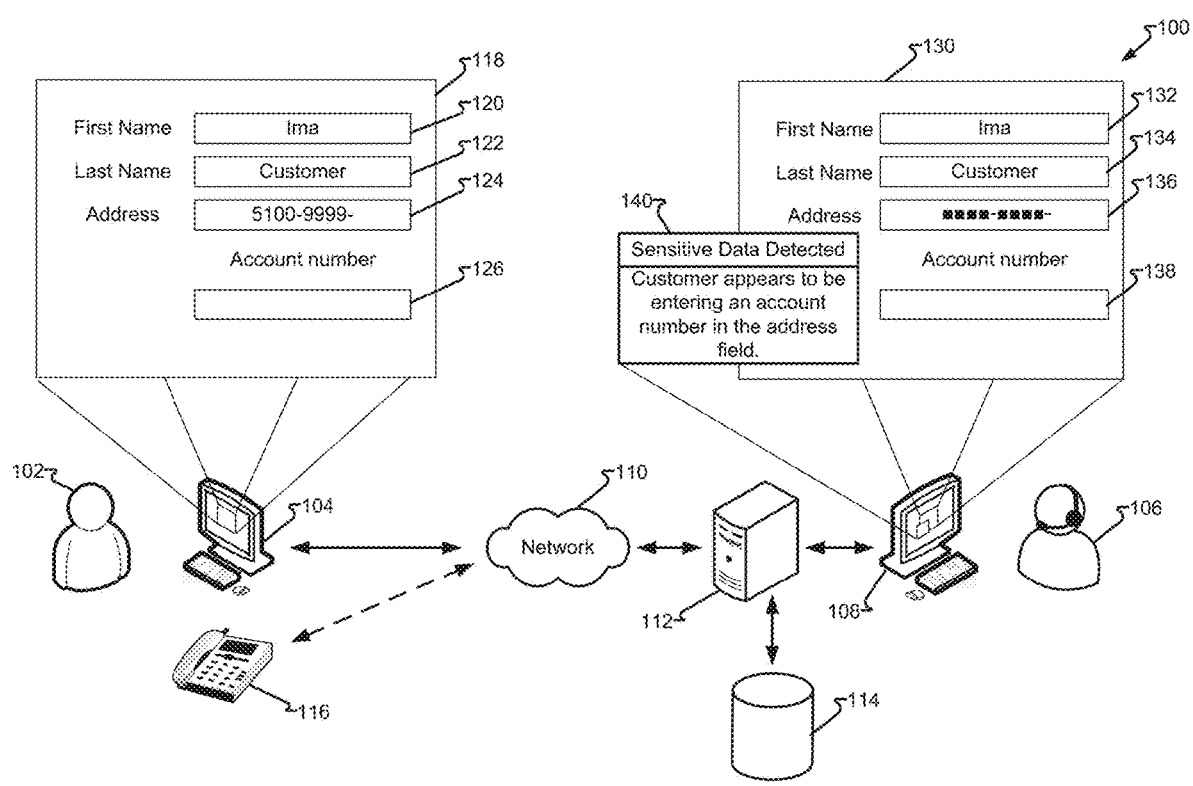
FIG. 1 depicts a first system in accordance with embodiments of the present disclosure.

FIG. 1 depicts system 100 in accordance with embodiments of the present disclosure. In one embodiment, user 102 is engaged in a co-browsing session with agent 106, such as to provide data to an application or online form, such as form 118. As user 102 enters data into form 118, agent device 108 presents the data on a corresponding co-browsing form 130 for presentation to agent 106. The data presented on co-browsing form 130 may appear on co-browsing form 130 on a character-by-character basis or after a number of characters have entered, such as upon completing a field and hitting "enter" or changing focus away from the field.

User 102 and agent 106 may also have a second communication channel, such as to accommodate text messages or voice communications and, as a further option, video. User device 104 may provide the secondary communication such as via a separate or integrated text, voice, or voice and video communication application. Therefore, agent 106 may speak to user 102, such as via a voice communication channel comprising user device 104 or, in another embodiment, via a different device such as secondary communication device 116 (e.g., telephone discrete from user device 104). As a benefit, agent 106 may guide, answer questions, or otherwise assist user 102 in completing form 118.

The co-browsing session occurs between user device 104 and agent device 108 via network 110 which may comprise one or more networks which may be public (e.g., Internet) or private (e.g., intranet) or a combination thereof. Server 112 comprises one or more microprocessors (or, more simply, "processor") which may further comprise or have access to a non-transitory data storage, such as database 114 to store machine instructions and/or data. Server 112 may optionally facilitate connectivity and/or provide other communication management to enable the co-browsing session and/or any secondary communications (e.g., voice, text, or video).

Fields of form 118 may be designated as 'sensitive' and data entered therein is not presented to agent 106 via agent device 108. Fields of form 118 may also be designated as 'non-sensitive' and data entered therein is presented to agent 106 via agent device 108. For example, first name field 120 and last name field 122 may be designated as non-sensitive and presented in co-browsing first name field 132 and co-browsing last name field 134. Account field 126 may be designated as sensitive and not presented in co-browsing account field 138. When data is entered into a sensitive data field, such as account field 126, what is presented in co-browsing account field 138 may be an indicia of entry that does not include the data entered, such as replacing alphanumeric, and optionally other characters, with blocks, stars, asterisks, or a status message (e.g., "blank," "data entry in progress," "data provided", etc.).

User 102 via human error, inattention, or misconfigured saved information within a browser utilized to complete form 118, may incorrectly enter data. For example, address field 124 is designated as non-sensitive as data entered therein is expected to be necessary to be presented to agent 106 in order to facilitate the co-browsing and the completion of form 118, or otherwise non-private, non-confidential information—assuming the data entered is the data expected. To avoid exposing sensitive data to agent 106, even when entered into a field designated as non-sensitive, server 112 executes a matching operation to determine if a pattern of the data entry matches a known pattern for sensitive data, such as may be maintained in database 114. For example, social security numbers have the form of nnn-nnn-nnnn, wherein "n" is a numeric character 0-9. Punctuations and other non-alphanumeric characters (e.g., slash "/", dash "-", whitespace characters, etc.) may be included in the pattern matching or omitted. Additionally or alternatively, certain characters may be matched. For example, a string of sixteen numbers that begins with "52" may be a credit card, whereas a string of sixteen numbers that begin with "99" is not a credit card (assumed to be accurate for illustrative purposes) and may represent other information or merely gibberish (e.g., the "9" character is inadvertently being pressed).

Server 112, upon determining data being entered matches a pattern, block the data entered from being presented. For example, user 102 has entered data into address field 124 that appears to match an account number format. Accordingly, server 112 may determine the match and block the content from appearing in co-browsing address field 136, such as by providing indicia of the data entry but omitting the contents of the data that is entered. As a further embodiment, sensitive data prompt 140 may notify agent 106 and/or user 102 of the reason data provided to address field 124 has been omitted in co-browsing address field 136. For example, sensitive data prompt 140 may be presented as a pop-up, color, audible message, or other message to indicate the data entered is not being presented and optionally why the data has been blocked. Agent 106 may elect to inform user 102, such as via the secondary communication channel and facilitate user 102 making any necessary corrections.

Data entered that cannot be conclusively determined as sensitive or not may be held temporarily or blocked temporarily. For example, and continuing the example above, some addresses will legitimately begin with "52." What is presented in co-browsing address field 136 may be an indicia of each character and then the characters, once determined to not comprise sensitive data. For example, user 102 enters "5280 Main Street" into address field 124. Co-browsing address field 136 may present a general status (e.g., "data being entered") or a character-by-character update for example "*" after the first character, "" after the second character, "*" after the third character, "**" after the fourth character, "***" after the space, and "5280 M" after the fifth character, wherein the data may be conclusively determined to not match a pattern of sensitive data and the indicia character (e.g., asterisk) removed and replaced with the character itself. The subsequent characters are similarly presented in co-browsing address field 136. It should be appreciated that some characters, but less than all characters may be blocked. For example, the "52" may be presented in co-browsing address field 136 but one or more subsequent characters blocked.

Server 112 may record the co-browsing session and optionally the secondary communications on the secondary communication channel. However, and in another embodiment, data entry values that are provided to sensitive data fields or sensitive data entered into non-sensitive data fields may be omitted from the recording. The recordings may be blank or have an indicia of data entry that omits the data itself.

In another embodiment, the function of server 112 may be embodied within agent device 108 and/or user device 104. For example, when embodied in user device 104 blocked data entry may not be transmitted or, in place of the data transmitted, indicia character(s) transmitted for presentation by agent device 108.

FIG. 2 depicts data structure 200 in accordance with embodiments of the present disclosure. Data structure 200 may be maintained in database 114 and comprise a number of records 208 describing fields within form 118 and, in particular, whether such fields are or are not expected to contain sensitive data. Accordingly, and in one embodiment, records 208 may comprise a field identifier 202, a plain language description name field 204, sensitive attribute 206, and optionally other fields utilized by server 112 or other systems to identify fields and their usage and/or expected data.

Record 208D indicates that the "Account Number" field (e.g., value of field identifier 202) has a "Yes" attribute for sensitive attribute 206. Accordingly, any data entered therein will be blocked from being presented to agent 106. Data entered into a field that is not sensitive, such as indicated by records 208A-C having sensitive attribute 206 of "No" are not blocked, provided the data entered therein does not match a pattern for sensitive data.

FIG. 3 depicts data structure 300 in accordance with embodiments of the present disclosure. Data structure 300 may be maintained in database 114 and comprise a number of records 314 describing masks wherein data entered may be determined to match and optionally other information. A mask may be to a particular type of character. For example, a character type of numeric, identified with the shorthand "n," matches any numeric character 0-9; a character type of alphabetic, identified with the shorthand "x," matches any alphabetic character a-z. Optionally case may be required (e.g., "X" to only match upper case alphabetic characters). Other character types include "any" (e.g., non-null), "whitespace" (e.g., space, tab, return, etc.), punctuation (e.g., period, comma, dash, hash, etc.), etc.

In one embodiment each of records 314 comprises mask identifier 302, mask 304, a likely data type 306, sensitive attribute 308. As a further embodiment, one or more records 314 may comprise a probably to be found in last name field 310, probability to be found in address field 312. As can be appreciated records for more, or all, fields of form 118 may be included. Records 314 may be provided in a priority order wherein a data entry is attempted to be matched to record 314A and, if not, then attempted to be matched to record 314B and so on. Matching may be done on a character-by-character basis for each character entered into a field.

A match to one mask may be conclusive of a match, such as eight or more numbers in a row matching mask 304 of record 314C. In another embodiment, a match may trigger further processing. For example, four digits, a dash, and four more digits may match mask 304 of record 314A. While this may indicate "account number" it is possible that the entry is an address. Accordingly, a match triggers subsequent processing, such as "Rule 31" (see FIG. 4).

Statistics regarding unexpected data entries may benefit form designers and agents, such as agent 106, to be aware of poorly designed forms or likely errors. For example, the placement of address field 124 directly above the text "Account number" may more often result in users entering account number into an address field and less likely to enter other data, such as a date of birth (not shown) that may appear elsewhere in form 118. As an additional benefit, a neural network may be trained such as to anticipate the types of mis-entered data that more likely occur with respect to certain non-sensitive fields. Accordingly, a pattern that appears to match a more likely type of mis-entered data, such as an account number, may be identified as sensitive with fewer characters entered, whereas a data entry of a less likely type of mis-entry, such as date of birth, may require more characters to be entered before identifying the data entered as sensitive.

In another embodiment, a neural network is provided, such as one or more processes embodied as machine-readable instructions maintained in a non-transitory memory and executed by a processor(s) of server 112 and/or agent device 108. The neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

By way of example, a first layer of nodes may evaluate a first character of a data entry to match a particular value of a mask (e.g., a first character of a mask within sensitive data mask field 304), when a match is detected, the nodes provide an input to a next layer of nodes, such as to evaluate a next character in a data entry. The next layer of nodes may look for character values and/or character relationships between patterns. Again, the nodes that find a target texture are active and provide an input to a next layer of nodes which may then look for particular patterns of characters and/or associations with other values in other data fields. The process continues until a conclusion is reached that a data entry is or is not sensitive data. It should be appreciated that a data entry may be considered sensitive until proven not to be sensitive. Additionally, a misidentification may be flagged by agent 106 and utilized for subsequent training.

FIG. 4 depicts data structure 400 in accordance with embodiments of the present disclosure. In one embodiment, record 400 may be maintained in database 114 and comprise a number of records 414. In one embodiment, record 414 comprises rule ID field 402, field ID 404, condition 406, condition if true field 408, and a condition if false field 410. For example, if a rule were called, such as the result of a full or partial match to a mask value maintained in mask field 304 of data structure 300, a first test may be to determine the field in which the data was entered, such as a field having a matching field to the value of field ID 404.

In one embodiment, situations may arise wherein a legitimate value matches a mask for sensitive data. For example, user 102 lives in a hypothetical city called "ABC." In ABC, addresses are known, or discovered, to take the form of "nnnn-nnnn", a pattern that matches a mask for sensitive data. Therefore, an entry into address field 124 having the format of "nnnn-nnnn" may be (or be the start of) sensitive data or, when the city is ABC, merely the expected address. Accordingly, a second condition identified in condition 406 is executed, for example, to determine if a city value (not shown and assumed to be previously entered) has a value of "ABC". If the city matches "ABC" then condition if true field 408 for record 414 executes, such as to indicate that the data entered is not considered sensitive. If condition 406 is false (e.g., the data entered matches the "nnnn-nnnn" format, but the city is not "ABC") then the value of false field 410 is executed, such as to compare the data entry to the next mask comparison (e.g., mask 304 of record 314B, see FIG. 3).

In another embodiment, the neural network may self-define rules and populate and/or modify data structure 400, such as when it is learned that a particular address, even though it resembles an account number, is proper for a particular city.

Figure 5:
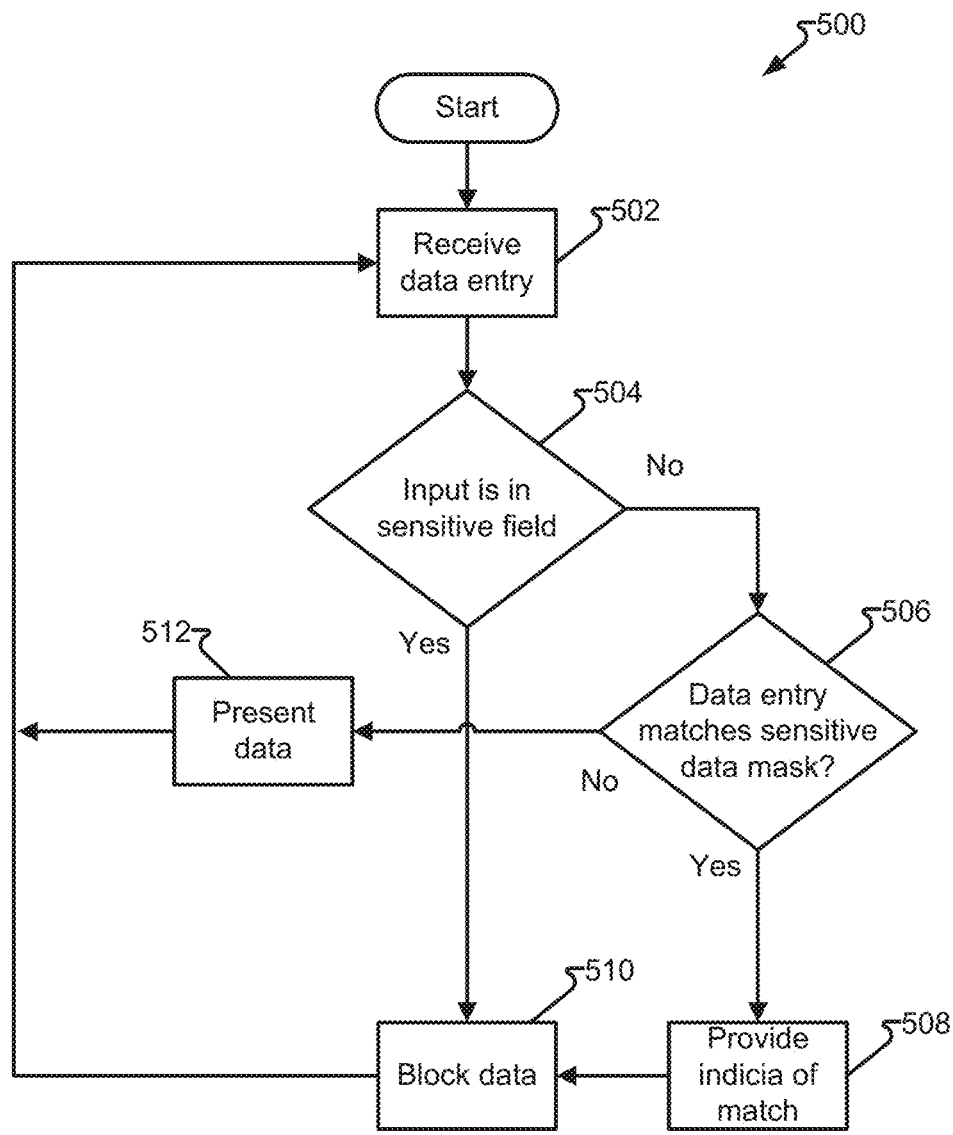
FIG. 5 depicts a process in accordance with embodiments of the present disclosure.

FIG. 5 depicts process 500 in accordance with embodiments of the present disclosure. Process 500 may be encoded as machine-executable instructions for execution by one or more processors, such as a processor of server 112. Upon establishing a co-browsing session between user device 104 and agent device 108, a data entry is received in step 502. Step 502 may be a single character, of one or more characters, or an entire entry of data into a field concluded by changing focus to a different field, hitting a "submit" or action associated with ending data entry into a field.

Test 504 determines if the data has been, or is being, entered into a field designated as sensitive, such as a record 208 having a value matching field identifier 202 value and having sensitive attribute 206 indicating "yes." (see, FIG. 2) and, if so, processing continues to step 510 wherein the data is entered into the form and underlying back-end processing, but blocked from being presented to agent 106 by agent device 108.

If test 504 is determined in the negative, processing continues to test 506 wherein the data entered is compared to one or more masks for sensitive information, such masks 304 of data structure 300 (see FIG. 3). If no match is found, processing continues to step 512 and the data entered is presented by agent device 108. If test 506 is determined in the affirmative, processing continues to step 508 wherein an indicia of the data entry, but not the data that has been entered, is caused to be presented by agent device 108. For example, a placeholder character, color change of the field, pop-up message, etc. Additionally, step 510 blocks the data entered from being presented. Process 500 may continue back to step 502 to receive additional data entry or terminate if data entry has concluded.

Figure 6:
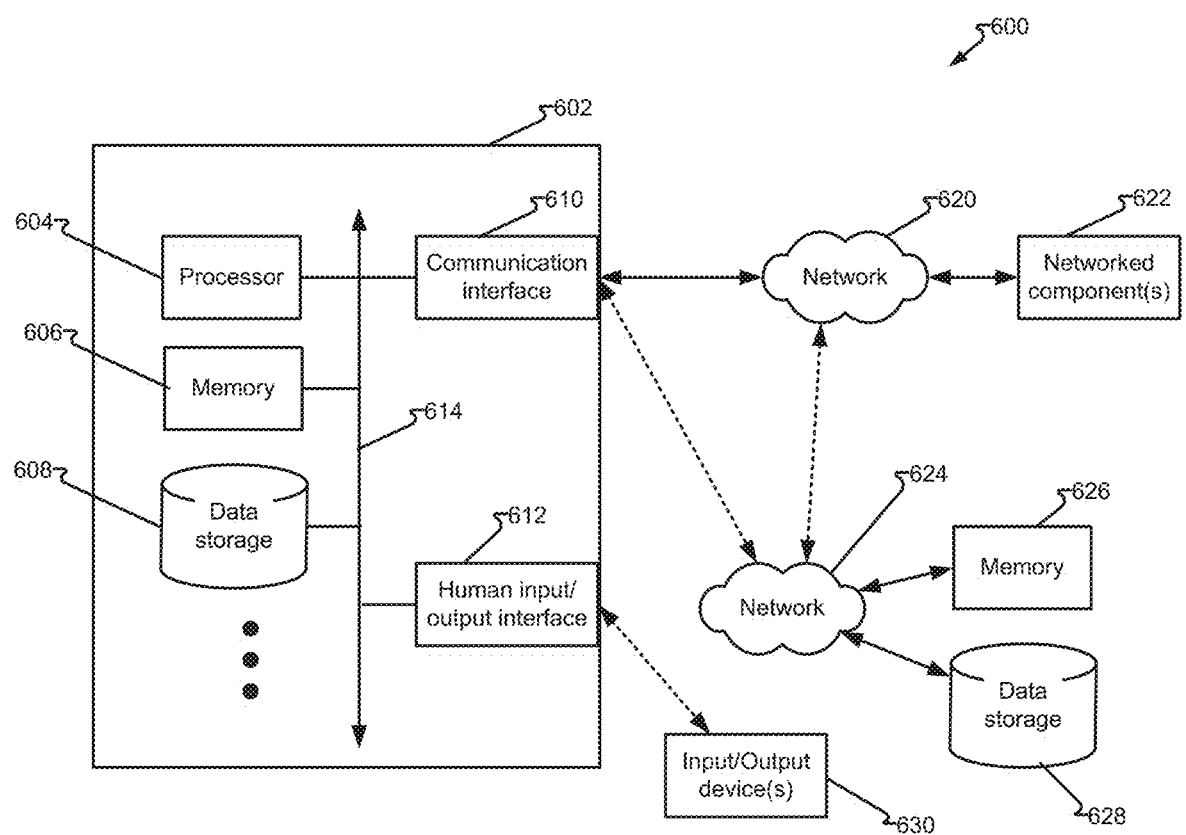
FIG. 6 depicts a device of a second system in accordance with embodiments of the present disclosure.

FIG. 6 depicts device 602 in system 600 in accordance with embodiments of the present disclosure. In one embodiment, user device 104 and/or agent device 108 may be embodied, in whole or in part, as device 602 comprising various components and connections to other components and/or systems. The components are variously embodied and may comprise processor 604. Processor 604 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 110 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular user device 104 may be enabled (or disabled) with a particular networked component 622. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a communication interface to a network; and
   a processor;
   wherein the communication interface receives, via the network, a data entry by a user utilizing a user device; and
   wherein the processor selectively presents or blocks the data entry from being presented to an agent by an agent device, while the agent device and the user device are engaged in a co-browsing session by:
   applying a temporary mask of the data entry by the user;
   determining whether the data entry by the user matches a sensitive data mask;
   wherein the processor maintains presentation of the temporary mask of the data entry by the agent device upon the processor determining that the data entry comprises a sensitive data match entered into a non-sensitive data entry field; and
   wherein the processor replaces the temporary mask of the data entry by the user and presents the data entry upon the processor determining that the data entry comprises non-sensitive data entered into the non-sensitive data entry field.

2. The system of claim 1, wherein maintaining the temporary mask blocks the data entry from being presented to the agent comprises presenting, via the agent device, and presents indicia of the data entry without presenting contents of the data entry.

3. The system of claim 2, wherein the indicia of the data entry comprises a representation of individual characters of the data entry.

4. The system of claim 1, wherein the processor determines the data entry comprises sensitive data upon matching the data entry to a pattern known to indicate sensitive data type.

5. The system of claim 4, wherein the processor provides a prompt to at least one of the user or the agent indicating the sensitive data type.

6. The system of claim 1, wherein the processor determines whether the data entry comprises sensitive data upon, further comprising executing a neural network trained to recognize sensitive data.

7. The system of claim 6, wherein training the neural network comprises:
   accessing a set of data entries that comprise sensitive data;
   applying one or more transformations to the set of data entries including, character alteration to a different character of the same character type, white space insertion, white space removal, punctuation insertion, and punctuation removal to create a modified set of data entries;
   creating a first training set comprising the accessed set of data entries, the modified set of data entries, and a set of non-sensitive data entries;
   training the neural network in a first stage using the first training set;
   crating a second training set for a second stage of training comprising the first training set and the set of non-sensitive data entries that are incorrectly detected as data entries that comprise sensitive data in the first stage of training; and
   training the neural network in a second stage using the second training set.

8. The system of claim 1, wherein the agent device and the user device are engaged in a voice communication via a voice channel concurrently with the co-browsing session.

9. The system of claim 1, wherein the agent device and the user device are engaged in a text communication via a text channel concurrently with the co-browsing session.

10. A method, comprising:
    conducting a co-browsing session over a network with a user device utilized by a user and an agent device utilized by an agent;
    receiving an input from a user into a data entry field; and
    selectively maintaining or removing a temporary mask of the input to the agent via the agent device;
    wherein presentation of the temporary mask is maintained to block the input on the agent device upon determining that the data entry comprises a sensitive data match entered into the data field having a non-sensitive data field identifier; and
    wherein the temporary mask is replaced by the input determining that the data entry comprises non-sensitive data entered into the data field having the non-sensitive data field identifier.

11. The method of claim 10, wherein maintaining the temporary mask blocks the data entry from being presented to the agent comprises presenting, via the agent device, and presents indicia of the data entry without presenting the contents of the data entry.

12. The method of claim 11, wherein the indicia of the data entry comprises a representation of individual characters of the data entry.

13. The method of claim 10, further comprising determining the data entry comprises sensitive data comprising matching the data entry to a pattern known to indicate sensitive data type.

14. The method of claim 13, further comprises prompting at least one of the user or the agent the prompt indicating the sensitive data type.

15. The method of claim 10, further comprising determining that the data entry comprises sensitive data upon executing a neural network trained to recognize sensitive data.

16. The method of claim 15, wherein the neural network is trained, the training comprising:
    accessing a set of data entries that comprise sensitive data;
    applying one or more transformations to the set of data entries, including, character alteration to a different character of the same character type, white space insertion, white space removal, punctuation insertion, and punctuation removal to create a modified set of data entries;
    creating a first training set comprising a collected set of data entries, the modified set of data entries, and a set of non-sensitive data entries;
    training the neural network in a first stage using the first training set;

creating a second training set for a second stage of training comprising the first training set and the set of non-sensitive data entries that are incorrectly detected as data entries that comprise sensitive data in the first stage of training; and training the neural network in a second stage using the second training set.

17. The method of claim 10, further comprising conducting a voice communication, via a voice communication channel, between the agent and the user concurrently with the co-browsing session.

18. The method of claim 10, further comprising conducting a text communication, via a text communication channel, between the agent and the user concurrently with the co-browsing session.

19. A server, comprising:
a network interface to a network and interconnecting a user device and an agent device for a co-browsing session, wherein a user provides data to an application executing on the user device;
a processor, comprising a number of microprocessors;
a data storage comprising a non-transitory data storage accessible to the processor; and wherein the processor performs:
receiving a data entry into the application;
applying a temporary mask to the data entry by the user;
determining whether the data entry by the user matches a sensitive data mask;
replacing the temporary mask of the data entry by the user and presenting the data entry to the agent device upon determining that the data entry omits sensitive data and the data entry is to a non-sensitive data field of the application; and
maintaining presentation of the temporary mask of the data to block the data entry from being presented by the agent device upon determining that the data entry is to the non-sensitive data field and comprises sensitive data.

20. The server of claim 19, wherein the processor provides the temporary mask of the data comprising presenting indicia of the data entry that omits contents of the data entry when presenting the temporary mask of the data to block the data entry from the agent device.

* * * * *